United States Patent [19]
Schmidt

[11] 3,802,596
[45] Apr. 9, 1974

[54] VENTILATED FUEL TANK FOR MOTOR VEHICLE

[75] Inventor: Wilfried Schmidt, Offenbach/Main, Germany

[73] Assignee: General Motors Corporation, Detroit, Mich.

[22] Filed: Sept. 18, 1972

[21] Appl. No.: 290,061

[30] Foreign Application Priority Data
Sept. 27, 1971 Germany.....................21480637

[52] U.S. Cl. .............................. 220/85 R, 220/86 R
[51] Int. Cl............................................. B65d 25/00
[58] Field of Search ............... 220/86 R, 85 S, 85 F; 137/587, 86 R, 85 R, 85 US, 85 UR

[56] References Cited
UNITED STATES PATENTS

| | | | |
|---|---|---|---|
| 3,643,690 | 2/1972 | Sarai | 220/86 R |
| 1,966,998 | 7/1934 | Steele | 220/85 F |

FOREIGN PATENTS OR APPLICATIONS

| | | | |
|---|---|---|---|
| 836,075 | 6/1960 | Great Britain | 220/86 R |

*Primary Examiner*—George E. Lowrance
*Assistant Examiner*—Allan N. Shoap
*Attorney, Agent, or Firm*—Peter D. Sachtjen

[57] ABSTRACT

A ventilated fuel tank assembly suitable for mounting as a structural unit within the body shell of a motor vehicle, comprises a hollow fuel storage tank having an extended hollow filler pipe through which liquid fuel may be introduced, said filler pipe being encircled adjacent the filler opening by a hollow collar, access to the interior of said collar from the interior of the filler pipe being provided by means of a small passage; the base of said collar having two connections therethrough situated diametrically opposite one another, one of said connections being to one end of a hollow breather pipe, the other end of which is secured within the fuel storage tank above the designed fuel level for the storage tank; and the other of said connections being to an overflow pipe, one end of which is located within the interior of said collar and the other end of which is located outside and adjacent the base of the fuel storage tank.

When the fuel tank assembly is mounted in position in a motor vehicle and the storage tank is filled with liquid fuel, any undue displacement of the fuel upwards in the filler pipe, due to vehicle movement or external heat, can be offset by the displaced fuel passing from the filler pipe into the collar and then back into the fuel storage tank via the breather pipe. If the quantity displaced is too great for the breather pipe to cope with, the excess fuel is expelled via the overflow pipe.

4 Claims, 3 Drawing Figures

VENTILATED FUEL TANK FOR MOTOR VEHICLE

The invention relates to fuel tanks of internal combustion engines, especially those of road vehicles. More specifically this invention relates to a fuel tank assembly consisting of a fuel overflow receptacle connected to a filler cap of the fuel storage tank, a breather pipe between the fuel storage tank and the overflow receptacle, and an overflow pipe leading from the overflow receptacle to the outside of the motor vehicle in which the assembly is mounted.

Ventilated fuel tanks are necessary in motor vehicles in order to guarantee the unhindered supply of fuel to the vehicle engine from the fuel tank. In known vehicle fuel tanks, the interior of the fuel tank is connected to the outside atmosphere by means of ventilation pipes. This means of equalizing the pressure within the fuel tank also ensures that in all possible positions of the fuel tank no fuel can be forced out of the fuel tank by overpressure due to fuel surge or evaporation. An overpressure can occur inside the fuel tank due to heating of the fuel as a result of high outside temperatures (such as, for example, those due to radiation of the sun). An overpressure can also be caused by the following running conditions of the vehicle: going up or downhill, negotiating bends, braking or accelerating. A ventilation device of the aforesaid type has been published in German Patent 1,175,097, in which a collecting basin is installed above and to the side of the air vent of the fuel tank. From this collecting basin a hose connection leads to the filler cap, and another one to the interior of the fuel tank.

The known type of ventilation device mentioned above requires a lot of space within the vehicle, and has another disadvantage in that the collecting basin and the various connections must be installed after the fuel tank has been mounted in place in the vehicle. This subsequent installation of the known ventilation device is therefore somewhat difficult due to the lack of space existing in the vehicle in the region of the installed fuel tank. In some vehicles, the fuel tank is installed behind the back rest of the rear seats to obtain maximum utilization of boot space for the vehicle. Such an arrangement of the fuel tank in the vehicle would not allow a collecting basin, such as that described in the already cited German Patent 1,175,097, to be installed above the fuel tank. An alternative arrangement already proposed having a breather pipe extending upwards above the tank, is hardly practicable in the arrangement of the fuel tank mentioned above, due to reasons of lack of space above the fuel tank.

The present invention provides a ventilated fuel tank assembly which is assembled prior to being fitted in its allotted position within a motor vehicle, and which not only has all the advantages displayed by fuel tanks equipped with known ventilating devices but also has the advantages of being of compact and robust construction. Accordingly, it is the principal object of this invention to provide a fuel tank assembly which avoids the aforesaid disadvantages of the known devices, so that ventilation of the fuel tank in the special arrangement mentioned above can be achieved without great expense or the use of complicated devices.

It is a further object of this invention to provide a fuel tank assembly in which an overflow receptacle is designed as an annular collar enveloping an air vent in the filler pipe and forms a complete unit together with the breather pipe and the fuel tank.

It is a still further object of the invention to provide a ventilation system for the fuel tank which is an integral unit of same, that is, without subsequent installation of a collecting basin and pipes to a previously installed fuel tank, said aggregate ventilation system/fuel tank being adapted to be installed easily and quickly within the vehicle. An especially useful feature of the invention is the space-saving arrangement of the annular collar in the special arrangement mentioned above, in which the filler pipe extends some way into the rear roof post of the vehicle and the filling opening is located relatively high up on the vehicle. Also, the invention avoids the possibility of assembly mistakes such as the wrong fitting of the hoses in the known ventilation systems or bending of the hoses, which can lead to damage to the hoses and the tank. Another advantage of the invention is that there are no longer any separate ventilation parts needed for the fuel tank, so that maintenance and installation costs are thereby reduced.

Another preferred feature of the invention which is very useful with regard to the aforesaid possibility of bending and breaking of hoses in the known devices, is that a steel pipe serves as the breather pipe, which pipe is fastened to the annular collar, preferably by welding. According to further features of the invention a space-saving connection of the pipes to the annular collar is achieved by the breather pipe and overflow pipe being connected to the annular collar at diametrically opposite points — preferably at the bottom of same — and by the breather pipe running parallel to the lowest surface line of the filler pipe, and the overflow pipe running parallel to the uppermost surface line of the filler pipe.

So that the annular collar can carry out its overflow function in every possible operating position of the vehicle it is installed as far above the fuel tank as possible. It is further suggested that the annular collar be arranged near to the opening of the filler pipe, preferably immediately underneath the vehicle body sheetwork which surrounds the filler neck. A useful effect of having the annular collar as high as possible is that the breather pipe is then relatively long, so that it can take up a considerable portion of any fuel that may be displaced from the tank as the result of vehicle motion or fuel evaporation due to heat.

To achieve simple and inexpensive manufacture of the annular collar proposed in the invention it is advantageous to make the annular collar out of two opposed cup-shaped sheets each of which has a centrally placed aperture in the base whose rim edge is turned substantially parallel to the sides of the cup-shape, and by making the cup rim of the cup-shaped sheet closest to the fuel tank overlap the corresponding cup rim of the other cup-shaped sheet. It is also advantageous in this connection if the outside surface of the filler pipe near to the annular collar also forms the inside wall of same. This produces the greatest volume of the annular collar for the smallest possible size of cup-shaped sheet. The assembly of cup-shaped sheets forming the annular collar are welded to the filler pipe adjacent the respective rim edges of the central apertures.

To make sure that the fuel tank cannot readily be overfilled without the conscious effort of the driver or filling-station attendant, the invention also proposes in addition to the measures described above that a filling limiter of a known type be incorporated on the inside of the fuel tank.

These and other features, advantages and objects of this invention will become more apparent from the following detailed description and drawings, in which.

Figure 1:
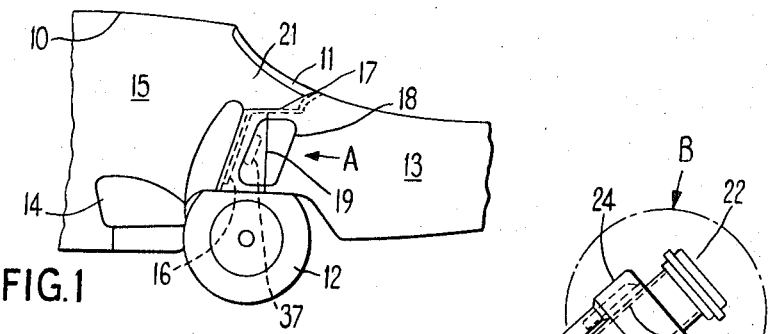
FIG. 1 shows a schematic side view of a portion of the rear of a car in section, with parts broken away.

The schematically drawn car rear shown in FIG. 1 includes the car roof 10, rear window 11, a rear wheel 12, the boot 13 and the rear seats 14. A partition separating the rear passenger space 15 from the boot 13 is designated by 16, and a rear window shelf behind the rear seats 14 by 17. A fuel tank 18 according to the invention is mounted laterally behind the rear seats 14 in the corner formed by the partition 16 and the rear window shelf 17. Fuel tank 18 is anchored in position adjacent the partition 16 and rear window shelf by means of struts 19, one of which is shown in FIG. 1.

A filler pipe 20 of the fuel tank 18 (see FIGS. 2 and 3), in the arrangement of the fuel tank 18 according to FIG. 1 projects partially into the right-hand rear post 21 of the car roof 10, the end of the pipe 20 remote from the tank 18 being externally threaded and having a filling aperture 23 therein. An internally threaded cap 22 closes the filling aperture 23 of the filler pipe 20 in a known manner.

Figure 2:
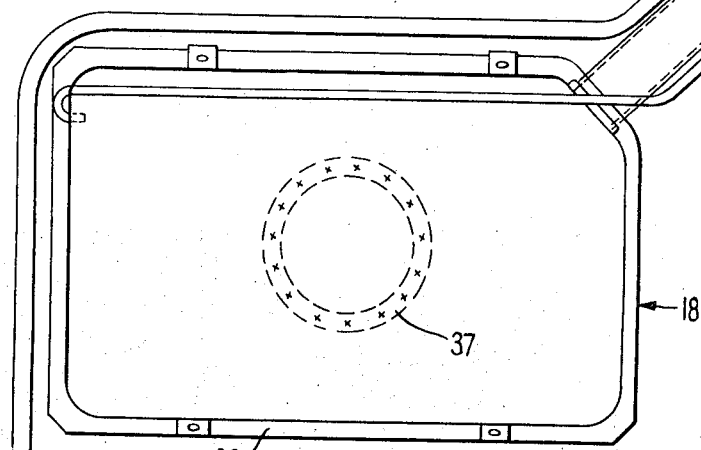
FIG. 2 shows a side view of a fuel tank assembly according to the invention, taken in the direction of the arrow A in FIG. 1.
Figure 3:
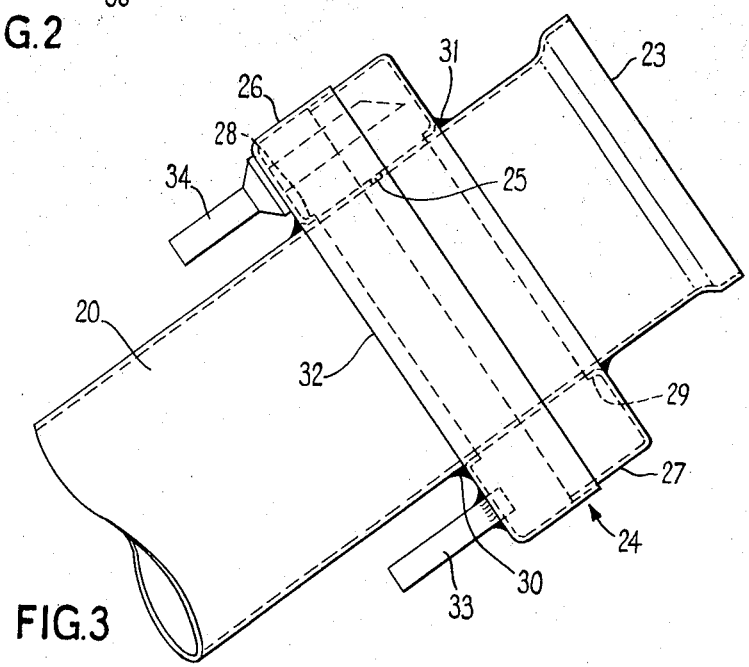
FIG. 3 shows an enlarged view of the inlet of the tank, ringed at B in FIG. 2.

As can be seen in FIGS. 2 and 3, a hollow annular collar 24 is fixed externally to the filler pipe 20 near the filling aperture 23, and is connected to the hollow interior of the filler pipe 20 by a small passage 25. As can be seen especially in FIG. 3, the annular collar 24 is formed by two cup-shaped sheets 26, 27 having flanges 28, 29 secured to the outside of the filler pipe 20 by being welded to the filler pipe by two continuous weld seams 30, 31. Escape of fuel from the annular collar 24 is prevented by the cup-shaped sheet 26 remote from the filling apertures 23 slightly overlapping and being in sealing engagement with the cup-shaped sheet 27 adjacent the filling aperture 23.

An open-ended breather pipe 33 extending from the interior of the fuel tank 18 into the annular collar 24 passes through the annular base of the cup-shaped sheet 26 and is welded in position to the surface 32 of the annular base of the cup-shaped sheet 26. Diametrically opposite the point at which breather pipe 33 passes through the base of the cup-shaped sheet 26 is a connection 34 for an open-ended overflow pipe 35, such that the end of the overflow pipe 35 extends into the collar 24 adjacent the small passage 25. The breather pipe 33 is made preferably of steel, so that the danger of it being snapped off during any movement of the fuel tank 18 or filler pipe 20 is greatly reduced. The parts numbered 24 to 35 form a ventilation device for the fuel tank 18. As can be seen in FIG. 2 the fuel tank 18 forms together with the ventilation device consisting of the parts 24 to 35, a structural unit which can be installed as a whole, that is, without after-assembly of the individual parts, within the vehicle in the place shown in FIG. 1. A flange 36 going round the fuel tank 18 is provided as shown in FIG. 2 for securing the fuel tank 18 to the car body. When the fuel tank 18 and the ventilating device are in position within the vehicle, the breather pipe 33 extends underneath, and substantially parallel to the filler pipe 20; and the overflow pipe 35 extends above, and substantially parallel to, the filler pipe 20.

The ventilation device described above is designed to come into action during the following running conditions of the vehicle: travelling up or downhill, going round bends, accelerating or braking. If fuel enters into the filler pipe 20 as a result of any one of the aforementioned conditions, some of the fuel will pass through the small passage 25 into the annular collar 24 and flow along it to collect adjacent the open end of the breather pipe 33, then to return back to the fuel tank 18 through the breather pipe 33. Also, fuel vapour leaving the fuel tank 18 via the filler pipe 20 or the breather pipe 33 can condense on the walls of the annular collar 24, and the fuel thus condensed can return back into the fuel tank via the breather pipe 33.

If the pressure inside the fuel tank increases so much that the capacity of the annular collar 24 and the breather pipe 33 can no longer take up all the fuel expelled from the tank 18, the excess amount of fuel is conducted to the outside through the overflow pipe 35. This overflow measure is of course only intended to occur for the most extreme cases of pressure build-up in the tank. To prevent such exceptional conditions occurring in the first place, a filling limiter 37 is installed in the tank 18 which filling limiter 37, as can be seen in FIGS. 1 and 2, is located on the wall of the fuel tank 18, facing the forward portion of the vehicle in which the tank 18 is installed. Since such filling limiters are already well known, the method of operation of said limiter is not indicated in the drawing. At the bottom of the filling limiter 37 there is a small filling hole, and in one of its sides a larger air vent. The effect of the filling limiter 37 is that when the fuel tank 18 is being filled with fuel the filling limiter 37 is only filled slowly on account of the size of the small filling hole, so that the level of liquid inside and outside the filling limiter 37 reaches the same height only after some time after filling has ceased. As a result an air space remains behind in the upper region inside the fuel tank 18, so that an increase in volume of fuel vapour due to heating of the fuel can be accommodated without fuel leaving the fuel tank 18 and entering into the annular collar 24.

I claim:

1. A motor vehicle fuel tank assembly having a hollow fuel storage tank with outlet means adapted to be connected to the fuel system of the motor vehicle, flange support means adapted to be connected to the motor vehicle, and elongated filler pipe means; said assembly including a cap removably closing said filler pipe means at the end thereof remote from the storage tank; an annular hollow collar having an annular base which encircles said filler pipe means and is secured thereto adjacent said cap; vent means in the portion of said filler pipe means encircled by said hollow collar for allowing fluid communication between the interior of the filler pipe means and the interior of said hollow collar; a breather pipe connecting the interior of said collar with the interior of the storage tank, said breather pipe being connected to the annular base of the collar; and an overflow pipe communicating the interior of said collar to the atmosphere adjacent the base of the storage tank, said overflow pipe being connected to the annular base of the collar at a point diametrically opposite the point of connection of said breather pipe.

2. A motor vehicle fuel tank assembly according to claim 1, in which the axis of said breather pipe extends below, and substantially parallel to, the axis of said filler pipe means; and the axis of said overflow pipe extends above, and substantially parallel to, the axis of said filler pipe means.

3. A motor vehicle fuel tank assembly having a hollow fuel storage tank with outlet means adapted to be connected to the fuel system of the motor vehicle, flange support means adapted to be connected to the motor vehicle, and elongaged filler pipe means; said assembly including a cap removably closing said filler pipe means at the end thereof remote from the storage tank; an annular hollow collar which encircles said filler pipe means and is secured thereto adjacent said cap, said hollow collar comprising two cup-shaped members, each of which has a centrally placed aperture within its base through which passes said filler pipe means, said cup-shaped members being assembled upon said filler pipe means such that the rims of said cup-shaped members face one another, the respective diameters of the rim of these cup-shaped members being such that the rim of one cup-shaped member fits in sealing engagement over the rim of the other cup-shaped member, the assembly of cup-shaped members being secured in position upon said filler pipe means by welding the respective rims of the centrally-placed apertures to the adjacent outer surface of the filler pipe means; vent means in the portion of said filler pipe means encircled by said hollow collar for providing communication between the interior of said filler pipe means and the interior of said hollow collar; breather pipe means connecting the interior of said collar with the interior of the storage tank; and overflow pipe means communicating the interior of said collar to the atmosphere adjacent the base of the storage tank.

4. A motor vehicle fuel tank assembly having a hollow fuel storage tank with outlet means adapted to be connected to the fuel system of the motor vehicle, support means adapted to be connected to the motor vehicle, and filler pipe means; said assembly including a cap removably closing said filler pipe means at the end thereof remote from the storage tank; an annular hollow collar which encircles said filler pipe means adjacent said cap defining an overflow fuel volume with a predetermined capacity, the interior of said filler pipe means being in fluid communication with the interior of said hollow collar to direct overflow fuel from said pipe means to said interior, breather pipe means connecting the interior of said collar with the interior of the storage tank for returning fuel from said collar interior to the storage tank, and overflow pipe means communicating the interior of said collar to the atmosphere adjacent the base of the storage tank to conduct excess fuel overflow from said collar interior exteriorly of the assembly thereby to prevent excessive pressure build-up in the tank when the overflow into the collar interior exceeds its capacity.

* * * * *